United States Patent Office 3,677,884
Patented July 18, 1972

3,677,884
VENEER CROSSBINDER AND LAMINATES PREPARED THEREFROM
Leopold F. Bornstein, Wilmington, Mass., assignor to Georgia-Pacific Corporation, Paoli, Pa.
No Drawing. Continuation of application Ser. No. 872,457, Nov. 24, 1969, which is a continuation of application Ser. No. 596,465, Nov. 23, 1966, which in turn is a continuation-in-part of application Ser. No. 327,124, Nov. 29, 1963. This application Feb. 3, 1971, Ser. No. 112,416
Int. Cl. C08g 37/38
U.S. Cl. 161—262                                14 Claims

ABSTRACT OF THE DISCLOSURE

A liquid resin composition comprising an alcohol solution of certain phenol-formaldehyde resins and a lignosulfonate acid salt has been found to be particularly suitable for use in the application of veneers to a base material such as particle board. Ammonium salts, such as ammonium chloride, are advantageously included in the composition. The liquid composition can be utilized for impregnating dry fibrous sheet materials such as cellulosic paper and dried. The resulting, dried, impregnated paper is used as an intermediate layer between, for example, a veneer and particle board, and minimizes telegraphing of surface imperfections from the particle board through the veneer or surfacing layer.

RELATED APPLICATIONS

This application is a continuation of application Ser. No. 872,457, filed Nov. 24, 1969, now abandoned, which is a continuation of application Ser. No. 596,465, filed Nov. 23, 1966, now abandoned, which is continuation-in-part of U.S. application Ser. No. 327,124 filed Nov. 29, 1963, now abandoned.

My invention relates to veneer crossbinders and laminates prepared therefrom. In particular my invention concerns lignin-sulfonate modified phenol-formaldehyde resin solutions, fibrous veneer crossbinder sheets impregnated with the solution and multiple ply laminates prepared therefrom.

Veneer laminates are commonly prepared by applying glue or other adhesive material to a base sheet such as a particle board and bonding thereto one or more thin, wear-resistant or decorative veneer sheets of wood or plastic. Thermosetting resins such as phenolic resins where the laminate is exposed to outdoor weather conditions and urea resins where only indoor use is contemplated are often used as the adhesive material in veneer laminates. One problem associated with the use of glues and adhesives is their tendency to penetrate the thin wood veneer sheet and thereby discolor the veneer surface. Another problem associated with the operation is that there often occurs a transfer of the imperfections of the rough uneven base material to the thin veneer sheet. This is particularly true when the laminate is prepared by a heat and pressure technique associated with thermosetting resins. The transfer of these imperfections from the base sheet to the veneer coatings is referred to as telegraphing.

In an effort to overcome some of the disadvantages associated with the liquid gluing and adhesive operations, thin tissue sheets impregnated with the glue or resin have been used to serve as a glue and adhesive carrier. This thin, resin impregnated sheet eliminates handling of the liquid glue solutions and is so designed to substantially disappear under the heat and pressure of the bonding operation. This impregnated tissue paper has not proven wholly satisfactory since the thin paper acting as a carrier sheet provides insufficient cushioning effect between opposing surfaces and fails to prevent telegraphing. Even though the sheet in effect becomes part of the bond to the base material and the veneer, unsatisfactory bonding characteristics are often noted, due in part to the lack of thermoplastic properties, including proper flow characteristics of the resin.

It is, therefore, an object of my invention to provide an excellent lignin-sulfonated modified phenol-formaldehyde solution for use in preparing veneer crossbinder sheets, which resin exhibits excellent aging characteristics and/or possesses good thermoplastic flow properties.

It is another object of my invention to provide an improved resin impregnated crossbinder sheet which prevents telegraphing and promotes excellent bonding between the base material and the veneer surface.

A further object of my invention is to provide a multiple veneer laminate structure and a method of preparing the same, which laminate possesses excellent internal bond, is prepared at low cost and exhibits a remarkable dimensional stability.

Additional objects and advantages of my invention will be more apparent from the following more detailed description and examples.

I have found that the objects of my invention are achieved by employing a fibrous sheet material impregnated with a lignin-sulfonated, phenol-formaldehyde resin solution. This heavy-gauge impregnated sheet is an excellent cross bonding sheet between plies of wood, preferably between plies of wood or veneers and particle board or betwen particle board and low or high pressure laminates. I have found that impregnated kraft paper or cheap board is particularly suitable since it remains as a substantial part of the laminate after the bonding operation and serves to bond the plies of wood to particle board or particle board to plastic laminate. Additionally, this heavy kraft paper serves as a cushion material which eliminates the transfer of any imperfections of the core surface, such as, for example, particle board, which is always rough and uneven to the wood or plastic veneer surface. This thick resin impregnated kraft paper not only prevents telegraphing when bonding is done under pressure, but additionally eliminates the necessity of a separate gluing operation and the use of one or more sheets to prevent telegraphing. The kraft paper employed in my invention is relatively inexpensive and promotes economy while the resin, fully impregnating the paper and present on both surfaces of the paper, promotes an excellent bond between the paper surface and the veneer and base material.

In order to provide the many advantages of my invention, the synthetic resin employed for impregnating the cellulosic cross binder sheet must have special characteristics. The resin should thoroughly penetrate the paper to prevent delamination in the paper during shearing; that is, the paper should be strong as the bond itself and become a part of the laminate structure. Further, the resin should be present on both sides of the heavy paper to promote good bonding action to the adjoining surfaces. Also, the resin should be low in cost to be practical in application. One important property of the resin is that it should not age or only age very slowly, so that the impregnated kraft paper can be used with dependable results after prolonged storage under normal temperature conditions, for example, after several months at temperatures of 100° F. or less. Good flow properties and high bonding strength are also most desirable resin characteristics.

I have found that suitable resins for the special purposes of my invention are one or two-step, fusible, i.e., alcohol-soluble, lignin-sulfonated, phenol-formaldehyde resins in alcohol or aqueous alcohol solution. The incorporation of from 30 to 70% by weight based on the phenol-formaldehyde resin of a ligno-sulfonate acid salt provides an inexpensive compatible material which promotes good thermoplastic resin flow. Additionally, these ligno-sulfonate salts being derived from cellulosic and wood products provide excellent bonding characteristics to the resin especially where the thin veneer sheet is a wood veneer, such a a porous, walnut or mahogany veneer. The ligno-sulfonate acid salts employed include those alkali and alkaline earth metal salts of ligno-sulfonate acids such as the sodium, potassium, calcium, magnesium, salts and the like. These ligno-sulfonate materials are readily available in large quantities in aqueous solutions.

A particularly suitable resin formulation for impregnating kraft paper for use as a cross binder in preparing multiple laminates is as follows:

| | Lbs. |
|---|---|
| Phenol | 9,000 |
| Formaldehyde (44% aqueous solution) | 5,200 |
| Oxalic acid (acid catalyst) | 80 |
| Sodium Hydroxide (neutralizing agent) | 600 |
| Calcium ligno-sulfonate solution (50% aqueous solution) | 9,000 |
| Isopropyl alcohol | 7,500 |
| Water | 2,500 |

The above formulation is an aqueous-alcohol calcium ligno-sulfonated, modified two-step, phenol-formaldehyde resin solution. The alcohol-aqueous solutions are preferred for impregnating the paper due to their ability to rapidly and uniformly penetrate the paper and the ease of drying the impregnated sheets. The above formulation employs phenol and a less than stoichiometric amount of formaldehyde, so that the conversion of the fusible resin in the solution requires the presence of an additional methylene generaing radical such as additional formaldehyde or hexamethylenetetramine. Although the above formulation is preferred and particularly suitable where enhanced shelf life of the impregnated paper is desired, an alkali catalyzed one-step aqueous-alcohol resin solution modified in a similar manner may also be employed in impregnating the thick-gauge, natural or synthetic, fibrous sheets.

Where a one-step resin is used, at least one mol of formaldehyde per mol of phenol is reacted in the presence of a basic catalyst such as inorganic hydroxides, quaternary ammonium hydroxides, tertiary amines and the like. These resins are cured to an insoluble, infusible condensation product under the heat and pressure of the bonding operation.

My resins modified by ligno-sulfonate salts exhibit excellent thermoplastic flow properties, and are particularly useful in preparing my impregnated or saturated cross-binder sheets. The flow properties are essential to insure a good transfer of resin to adjoining surfaces essential for good bonding characteristics. This is especially true even where one of the surfaces to be bonded is quite irregular or even slightly warped.

In the above formulation, oxalic acid is employed at the acid catalyst; however, any other acid, organic or inorganic, or an acid salt may be employed as a suitable catalyst, as is well known in the art. The neutralizing agent in the above reaction is sodium hydroxide; however, this may be replaced with potassium hydroxide or another caustic salt. Although calcium ligno-sulfonate gives the best results, ammonium, potassium, sodium or other water or alcohol soluble ligno-sulfonate salts may also be employed.

The preferred novolak formulation was prepared by dispersing the phenol and the formaldehyde and aqueous oxalic acid in a jacketed autoclave equipped with an agitator. The contents were very carefully heated and brought to reflux at a temperature of about 95° to 100° C. This reflux condition was maintained for about one hour, after which time approximately 600 pounds of caustic soda of a 40 percent solution was added to the mixture and the resin dehydrated under vacuum and full steam until the temperature which dropped after application of the vacuum to about 60° C. reached 90° C. At this time, the isopropyl alcohol and water were added to the mixture with simultaneous cooling to about 40° C. When a uniform solution was obtained, the calcium ligno-sulfonate solution was added with agitation. The clear homogeneous resin solution then obtained was cooled at room temperature and discharged. This finished aqueous alcohol resin solution had the following properties: solids content of 50 percent, viscosity 300 to 500 cps., a pH of 9.0 to 9.5.

Prior to impregnating or saturating a kraft paper with this resin solution, a curing amount of about 5 percent by weight of hexamethylenetetramine was dissolved in an equal amount of water and added to the resin solution. This compound dissolved readily in the resin solution and serves as a curing catalyst for the resin at the pressing temperatures of the laminates. Under usual and conventional storage conditions this hexamine is relatively inactive, and thus the shelf life and the aging characteristics of the treated paper is excellent. The employment of a curing catalyst or a source of methylene radicals which is activated only under the conditions of the bonding operation serves to provide a particularly long and desirable shelf life for the paper. Thus, the resin in the kraft paper is only cured as required during the laminate bonding operation.

The hexamine-containing resin solution is then applied to the paper in conventional treating machines with or without preheating, depending upon the length and construction of the treating machine. The impregnating operation is carried out to achieve a thorough impregnation of the paper (for example, paper 0.010 inch in thickness) and to provide a thin layer of the resin on both surfaces of the paper. The recommended resin pick-up by the paper should be between 40 and 60 weight percent of the paper. The impregnated paper is then dried at approximately 150° to 200° F. to a volatile content of about 6 to 10 percent.

The resin impregnated dry kraft paper may then be employed when desired in the construction of laminates. My paper finds particular utility when employed in laminates between an uneven rough base material and a smooth thin veneer sheet. For example, my paper permits laminated structures between particle board and very thin wood or plastic veneer sheet of remarkable dimensionable stability without telegraphing to be prepared. My paper inhibits these veneers from shrinking, and also improves the flatness of the laminate structures. My paper may also be used for bonding purposes between other sheet material, such as between two thin veneer sheets or in any multiple ply laminated structures. My paper may be used with dependable results after storage periods of one, two or three months or more without degradation of the bonding characteristics of the two-step resin under normal storage conditions.

In one embodiment a resin impregnated kraft paper may be placed between a rough, uneven particle board and a thin walnut veneer, and the sheets bonded into a unitary laminate structure by the application of heat and pressure. For example, the bonding operation may be accomplished by employing a pressure of from 50 to 1,000 p.s.i., and the use of temperatures from 240° to 340° F. The hot pressing operation should be conducted at a sufficiently high temperature so as to promote the cure of the resin at that temperature. Therefore, with the use of hexamine, a temperature of about 240° F. or more should be employed. The time for the hot pressing operation will vary depending upon the heat transfer characteristics of the laminates, however, 1 to 5 minutes is often employed.

The incorporation of the lignosulfonate salt in my resins improves the thermoplastic character of the resin and thereby promotes good contact and flow of the resin during the hot pressing operation.

I have also discovered that the ligno-sulfonate, phenol-formaldehyde resins of my invention may be further improved in bonding strength, especially at low curing temperatures and/or short curing cycles, by the incorporation therein of about 2 to 10 weight percent of an ammonium salt which decomposes at the curing temperatures and to yield ammonia and a strong acid. The released ammonia acts as a plasticizing agent on thin wood veneers and improves the bond between wood veneers and plywoods, fiber boards, particle boards and the like. The released strong acids from the ammonium salts shorten the curing cycles and lower the curing temperature thereby promoting efficiency in the bonding operation. Suitable ammonium salts to be employed for this purpose include both organic and inorganic ammonium salts. For example, useful salts include ammonium oxalate, ammonium chloride, ammonium sulfate, ammonium phosphate and the like are excellent additives agents. These ammonium salts should not include urea or urea derivatives which will act as a resin forming material, and thus shorten the aging characteristics of the resin impregnated paper. Thus urea is not included herein as an ammonium salt for this purpose.

I have thus described a special two-step, alcohol-soluble resin formulation which is particularly suitable for impregnating a thin or thick gauge paper sheet material and forming an improved cross binder sheet of good shelf life. A heavy gauge, cross binder sheet enables laminate structures of thin veneers to uneven base material with no telegraphing and having excellent stability characteristics to be prepared. My resin solution has excellent penetrating properties, good thermoplastic flow characteristics, and is prepared from relatively inexpensive materials. My crossbinder sheets provide laminates of enhanced bonding strength and improved dimensional stability. My paper crossbinder sheets have good shelf life and inhibit telegraphing and serve as a structural component of the laminate prepared.

Accordingly, the resin solution contemplated in accordance with the present invention consists essentially of solids dissolved in a solvent in which the solids comprise a major amount of an uncured alcohol-soluble, fusible, phenol-formaldehyde resin, from about 30 to 70% by weight based on said resin of a ligno-sulfonate acid salt selected from the group consisting of the alkali metal and alkaline earth metal salts and up to 10 percent by weight of said resin of an ammonium salt of a strong acid which decomposes at a temperature up to the normal curing temperature of the resin to yield ammonia and a strong acid compound, said solvent comprising at least 15 percent by weight of an alcohol which is a solvent for said resin and the balance water.

It is to be emphasized that an essential characteristic of the resin is its fusibility for promotion of flow under the influence of temperature and that its alcohol solubility is merely a factor indicating the existence of this fusibility characteristic of the solid resin. The requirement for alcohol solubility of the solid resin is not, therefore, to be confused with the alcohol tolerance which may exist for water solutions of a number of infusible phenol-formaldehyde resins. As will also be noted from the above description of the resin solution of the present invention, the ammonium salt is not an absolute requirement but may be omitted. However, the use of the ammonium salt in amounts in the range of 2 to 10 percent based on the resin permits curing at very significantly lower temperatures than possible in the absence of such salts and/or very significantly reduced curing cycle periods. For example, the use of about 5 percent by weight based on resin of ammonium chloride has reduced the curing temperature as much as 20° and more, and has also been shown to reduce curing cycle time by as much as 25 percent.

What is claimed is:

1. A liquid resin composition for impregnating a sheet material consisting essentially of a solution of resin solids in an alcohol solvent, said resin solids comprising a major amount of an uncured, fusible, alcohol-soluble phenol-formaldehyde resin, from 30 to 70 percent by weight of said resin of a ligno-sulfonate acid salt of a metal selected from the group consisting of alkali metal and alkaline earth metals, and up to 10 percent by weight of an ammonium salt of a strong acid, which salt decomposes at a temperature up to about the normal curing temperature of said resin to yield ammonia and a strong acid compound, said alcohol solvent comprising at least 15 percent by weight of alcohol with the balance essentially water.

2. The composition of claim 1 wherein the amount of the ammonium salt is from about 2 to 10 percent by weight of the phenol-formaldehyde resin.

3. The composition of claim 1 wherein the salt radical of the ligno-sulfonate acid salts is calcium.

4. The composition of claim 1 wherein the ammonium salt is ammonium chloride.

5. The composition of claim 1 wherein the phenol-formaldehyde resin is a two-stage resin with the phenol reacted with less than a stoichiometric amount of formaldehyde and which composition includes a curing amount of hexamethylene tetramine added to the resin solution.

6. A composition in accordance with claim 1 wherein said solids consist essentially of said resin, about 40 to 60 percent by weight based on said resin of calcium lignosulfonate, and from 2 to 10 percent by weight based on said resin of ammonium chloride.

7. The composition of claim 6 wherein the phenol-formaldehyde resin is a two-stage resin with the phenol reacted with less than a stoichiometric amount of formaldehyde and which composition includes a curing amount of hexamethylene tetramine added to the resin solution.

8. A composition according to claim 6 wherein said resin is an uncured, fusible, alcohol-soluble phenol-formaldehyde novolak resin, which composition further includes a curing amount of hexamethylene tetramine.

9. A sheet material for use in preparing laminates which material comprises:
a dry, fibrous sheet material impregnated with the resin composition of claim 1, the sheet of sufficient thickness to prevent telegraphing of any surface imperfections of a base material when the sheet is employed for cross binding purposes in a laminate, the sheet containing a sufficient amount of resin to bond a thin top sheet material to said base material.

10. The sheet material of claim 9 wherein the fibrous sheet is a cellulosic paper sheet material.

11. The sheet material of claim 9 wherein the sheet material is a cellulosic paper sheet impregnated with the resin composition of claim 8.

12. A laminate which comprises in combination:
a base material characterized by at least one rough, uneven surface;
a thin decorative or protective top sheet material; and
a fibrous sheet material impregnated with a resin composition comprising a cured, infusible, insoluble phenol-formaldehyde resin and a ligno-sulfonate acid salt, the acid salt present in an amount sufficient to imparted thermoplastic flow properties to the phenol-formaldehyde resin in its uncured, fusible, alcohol-soluble state, the fibrous sheet material located between the top sheet material and the uneven surface of the base material and bonded thereto by the cured resin composition, the fibrous sheet material serving as a veneer cross binder substitute and of sufficient thickness to prevent telegraphing of the surface imperfections of the base material to the thin top sheet material.

13. The laminate of claim 12 wherein the top and base sheet material are bonded by curing therebetween sheet material of claim 9.

14. The laminate of claim 12 wherein the base sheet material is particle board, the thin top sheet material is a thin wood veneer sheet material and the fibrous sheet material is a resin impregnated heavy-gauge cellulosic paper sheet.

References Cited
UNITED STATES PATENTS

| | | | |
|---|---|---|---|
| 2,159,411 | 5/1939 | Wallace | 260—57 |
| 2,664,377 | 12/1953 | Van Beckum et al. | 154—132 |
| 2,794,790 | 6/1957 | Marshall et al. | 260—17.5 |
| 2,956,033 | 10/1960 | Apel | 260—17.5 |
| 3,046,171 | 7/1962 | Rogers | 154—45.9 |
| 3,336,185 | 8/1967 | Melbing | 161—170 |

FOREIGN PATENTS

| | | | |
|---|---|---|---|
| 370,752 | 4/1932 | Great Britain | 260—17.5 |

WILLIAM H. SHORT, Primary Examiner

E. A. NIELSEN, Assistant Examiner

U.S. Cl. X.R.

117—155 L; 156—335; 161—264; 260—17.5